(No Model.)   2 Sheets—Sheet 1.

W. E. ROSS.
ANTI-FRICTION BEARING.

No. 409,430.   Patented Aug. 20, 1889.

WITNESSES:
John H. Deemer
E. M. Clark

INVENTOR:
W. E. Ross
BY Munn & Co.
ATTORNEYS.

(No Model.) 2 Sheets—Sheet 2.
W. E. ROSS.
ANTI-FRICTION BEARING.

No. 409,430. Patented Aug. 20, 1889.

WITNESSES:

INVENTOR:
W. E. Ross
BY Munn & Co.
ATTORNEYS.

UNITED STATES PATENT OFFICE.

WILLIAM E. ROSS, OF SPARTA, NEW JERSEY.

ANTI-FRICTION BEARING.

SPECIFICATION forming part of Letters Patent No. 409,430, dated August 20, 1889.

Application filed June 26, 1889. Serial No. 315,622. (No model.)

*To all whom it may concern:*

Be it known that I, WILLIAM E. ROSS, of Sparta, in the county of Sussex and State of New Jersey, have invented a new and Improved Anti-Friction Bearing, of which the following is a full, clear, and exact description.

The object of my invention is to provide a bearing for car-axles that will reduce the friction thereof, the bearing being also applicable to parts of machinery where a shaft or spindle is journaled.

The invention consists in the construction and combination of parts, as will be hereinafter fully described and claimed.

Reference is to be had to the accompanying drawings, forming a part of this specification, in which similar letters of reference indicate corresponding parts in all the figures.

Figure 1:
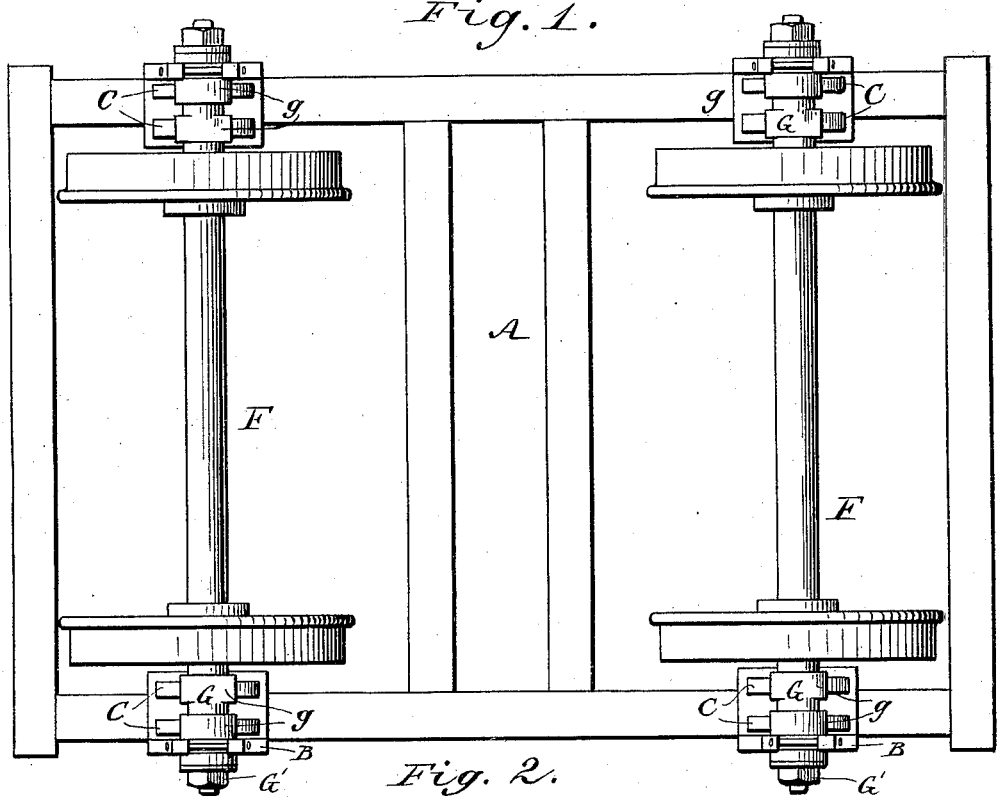
Figure 2:
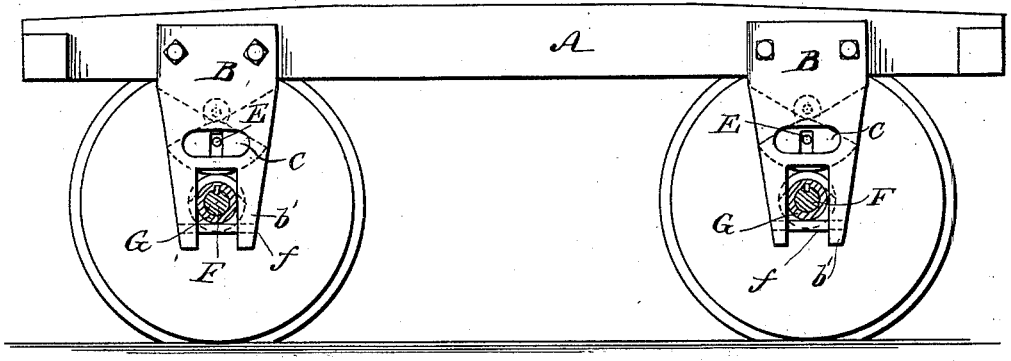
Figure 6:
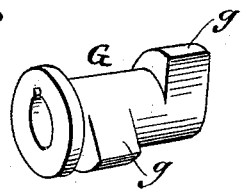
Figure 3:
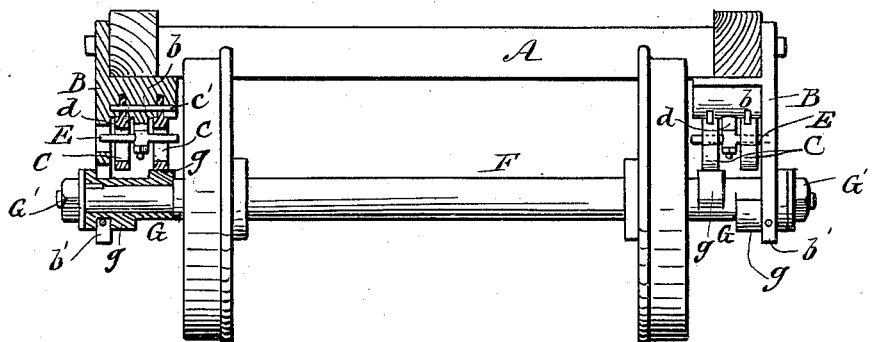
Figure 4:
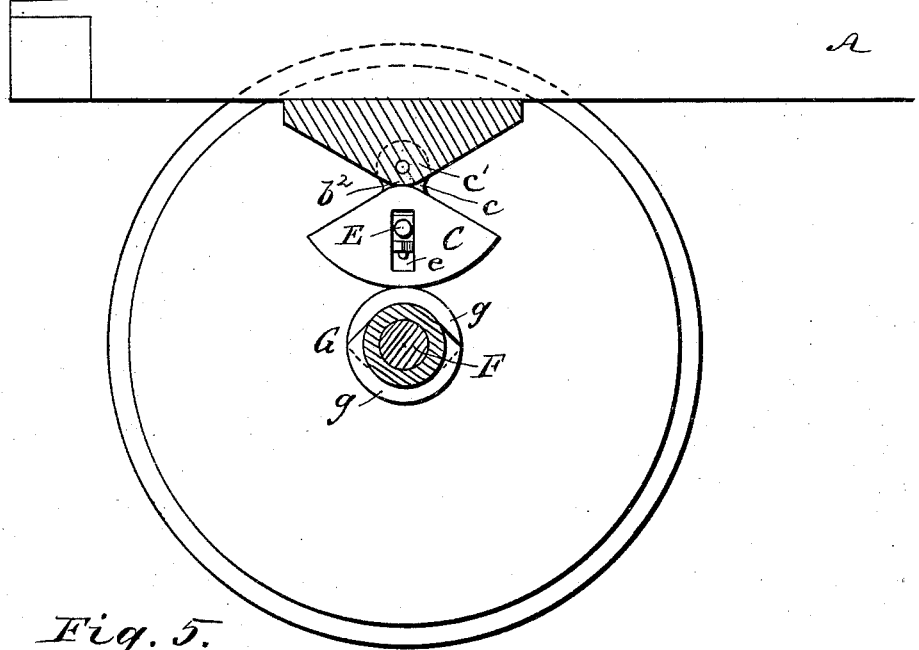
Figure 5:
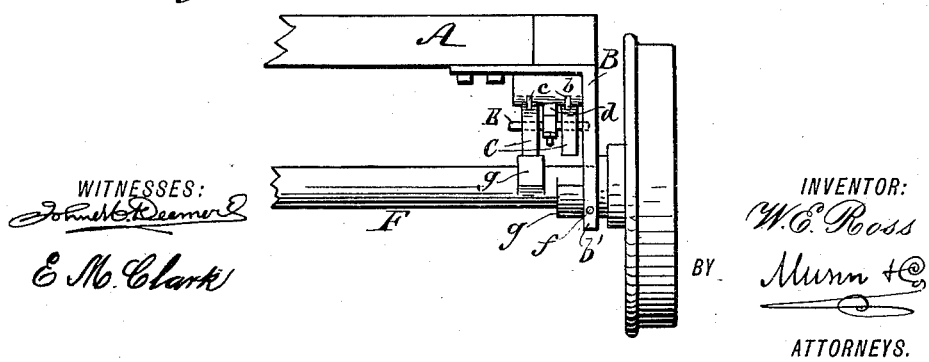

Figure 1 is an inverted plan view of a car-truck with my improved bearing applied. Fig. 2 is a partly-sectional side view of the same. Fig. 3 is an end view of a car-truck with one hanger in full and the other in section. Fig. 4 is an enlarged side view of a car-wheel with bearing. Fig. 5 is an end view showing the bearing applied to a hand-car, and Fig. 6 is a detail.

The car-truck, made up of the usual timbers A, carries the hangers B, the same being securely bolted to the truck. The hangers B are made in angular form, with a body portion $b$ bearing against the under side of truck and arms $b'$ depending therefrom.

C are bearing-blocks, sector-shaped, with a curvilinear bearing-face and rounded ears $c$. I have shown the blocks sector-shaped; but they may be made in any suitable form. The ears $c$ fit in correspondingly-shaped depressions in the body $b$ of the hanger B to give them a bearing, and pins $c'$, passing through the hanger-body $b$ and perforations in ears $c$, lock the latter against displacement. The body $b$ of the hanger B has its surface at $b^2$ rounded off to correspond with the abutting surface of the blocks C, so that the said blocks will rock easily on the surface of the body portion of hangers B.

D is a post projecting from the hanger-body $b$ and carrying the loosely and centrally pivoted lever E. The ends of the lever E work in the slots $e$ of the bearing-blocks C.

The car-axle F, carrying the wheels, is provided with a sleeve G, fitted thereon at the end outside of the wheels and between the same, and a retaining-nut G' on end of axle. The axle, with its sleeve, is held by a pin $f$, passing through the bifurcated end of the arms $b'$ of hanger B. The sleeves G are provided with sectors or bearing-faces $g$, one of which is set in advance of the other and facing opposite, so that they will engage and carry the bearing-blocks C in opposite directions. The bearing-faces of the two sectors $g$ form a complete circular bearing, as illustrated in Fig. 4. In case sleeves are not applicable to the axles, as in hand-cars, the sectors or bearing-faces will have to be formed directly on the axles, as shown in Fig. 5.

In operation, as the axle F revolves one of the sectors $g$ comes in contact with the bearing-block immediately above and carries the same forward, the block also carrying one end of the horizontal swinging lever E forward. The other end of said lever going back carries the other bearing-block C back to a position where its engaging sector will bear on the curvilinear face thereof. When the sector that has carried the block above forward the same leaves the curvilinear face and the other sector engages the other block to go forward, the first block comes back for re-engagement.

Having thus described my invention, what I claim as new, and desire to secure by Letters Patent, is—

1. The combination, with an axle provided with two or more sectors, of bearing-blocks pivotally secured to a car-hanger and having curvilinear bearing-faces, and a horizontally-swinging lever engaging the bearing-blocks, as and for the purpose set forth.

2. The combination, with an axle having a sleeve provided with two or more sectors, of bearing-blocks pivotally secured to a hanger and having curvilinear bearing-faces, and a horizontally-swinging lever engaging the bearing-blocks, substantially as shown and described.

3. The combination, with the hangers B, of the bearing-blocks C, having ears $c$, the lever E, engaging in slots in the blocks C, and the sleeve G, provided with sectors $g$ on the axle, substantially as shown and described.

WILLIAM E. ROSS.

Witnesses:
BENJ. F. HOLSKE,
EDGAR TATE.